United States Patent [19]

Ohta

[11] Patent Number: 4,779,156
[45] Date of Patent: Oct. 18, 1988

[54] CHUCKING MECHANISM FOR MAGNETIC TAPE CARTRIDGE USED WITH DISK DRIVE

[75] Inventor: Toshiro Ohta, Kanagawa, Japan

[73] Assignee: Sony Corporation, Tokyo, Japan

[21] Appl. No.: 942,707

[22] Filed: Dec. 17, 1986

[30] Foreign Application Priority Data

Dec. 28, 1985 [JP] Japan .................. 60-293521

[51] Int. Cl.⁴ .................................. G11B 23/02
[52] U.S. Cl. .................... 360/132; 360/93; 360/96.3
[58] Field of Search .............. 360/132, 133, 96.3, 360/93; 242/55.19 A, 198, 199

[56] References Cited

U.S. PATENT DOCUMENTS

| | | | |
|---|---|---|---|
| 4,492,998 | 1/1985 | Kamimura et al. | 360/132 |
| 4,528,606 | 7/1985 | Tsuchiya | 360/96.3 |
| 4,654,740 | 3/1987 | Katoku | 360/132 |

Primary Examiner—John H. Wolff
Attorney, Agent, or Firm—Lewis H. Eslinger; Jay H. Maioli

[57] ABSTRACT

A chucking and driving mechanism for a disk-drive-compatible magnetic tape cartridge, including a first chucking mechanism for establishing chucking engagement between a center core disk of the magnetic tape cartridge and a turntable of a disk drive while the disk drive drives the magnetic tape in forward direction, and a second chucking mechanism for establishing chucking engagement between the center core disk and the turntable while the disk drive drives the magnetic tape in reverse direction.

21 Claims, 6 Drawing Sheets

CHUCKING MECHANISM FOR MAGNETIC TAPE CARTRIDGE USED WITH DISK DRIVE

BACKGROUND OF THE INVENTION

1. Field of the Invention

The present invention relates generally to a magnetic tape cartridge for use as a data storage media. More specifically, the invention relates to a magnetic tape cartridge compatible with a disk drive and being particularly useful as backup storage media for a computer. Further particularly, the invention relates to a tape drive mechanism for a disk-drive-compatible magnetic tape cartridge, in which the tape drive mechanism is capable of steadily driving the magnetic tape both in forward and reverse directions.

2. Description of the Background Art

As is well known, magnetic tape has a relatively large data storage capacity. Magnetic tape is especially useful as a storage medium when fast access is not required, such as when used for backup storage. However, on the other hand, because of the relatively slow access to the desired data, tape is less popular than disk-type storage media, such as floppy disks, hard disks and so forth. Therefore, recent computers generally employ disk-based data storage systems as built-in or external units.

Various floppy disks and disk drives designed for use with associated disks have been developed and proposed. For example, the U.S. Pat. No. 4,445,155, issued on Apr. 24, 1984, to Takahashi et al discloses a typical construction of a microfloppy disk, i.e. a 3.5-inch floppy disk and a disk drive therefor. The floppy disk is in the form of a floppy disk cassette or cartridge generally comprising a flexible magnetic disk and a cassette or cartridge casing. The flexible disk includes a center core disk designed to be chucked on a turntable of the disk drive. The disk drive drives the flexible disk and the center core disk to rotate.

Floppy disks are useful for fast access. On the other hand, floppy disks have limited data storage capacity. Archival or backup storage of data stored on a hard disk generally takes 20 to 80 floppy disks due to the larger capacity of a hard disk. This involves substantial expense to the user. On the other hand, magnetic tape can easily accommodate all of the data stored on a hard disk, as is well known. However, a special tape recording and/or reproducing apparatus has previously been necessary for copying data from the hard disk onto the magnetic tape storage medium. This is an additional expense for the user.

So as to allow the user to utilize magnetic tape for inexpensive backup storage of data on hard disks or floppy disks, it would be beneficial to provide a magnetic tape cartridge compatible with floppy disk drives so that it may be driven by the same drive unit as floppy disks.

Generally, the magnetic disk, the usual media to be used with the disk drive, is driven in rotating fashion. Therefore, one-way driving to drive the disk in a fixed single direction will never raise any significant problem. However, on the other hand, in case of the disk-drive-compatible magnetic tape cartridge, a difficulty is encountered in the single direction driving. Namely, as long as only single direction, i.e. forward direction, driving is allowed for the disk drive, the access period for accessing over various recording tracks on the magnetic tape becomes unacceptably long, since such single directional driving requires a rewinding operation to switch recording tracks to be accessed. Therefore, it is preferable to provide two-way driving, i.e. forward and reverse direction drive, of the magnetic tape.

However, since the normal disk drive systems have been designed to drive the magnetic disk in a single direction, reverse direction driving has been impossible due to slip caused between the turntable of the disk drive and the center core disk of the magnetic tape cartridge and resulting in misalignment of tape information tracks in relation to the magnetic recording head of the disc drive.

SUMMARY OF THE INVENTION

Therefore, it is an object of the present invention to provide a chucking and driving mechanism for driving a disk-drive-compatible magnetic tape, which can significantly shorten access-time of a magnetic tape.

Another object of the present invention is to provide a magnetic tape cartridge chucking mechanism for driving the magnetic tape both in forward and reverse directions.

A further specific object of the invention is to provide a chucking and driving mechanism which can maintain the magnetic tape cartridge in a stably chucked condition during both forward and reverse driving of the magnetic tape.

In order to accomplish the aforementioned and other objects of the invention, a chucking and driving mechanism for a disk-drive-compatible magnetic tape cartridge, includes a first chucking mechanism for establishing chucking engagement between a center core disk of the magnetic tape cartridge and a turntable of a disk drive while the disk drive drives the magnetic tape in a forward direction, and a second chucking mechanism for establishing chucking engagement between the center core disk and the turntable while the disk drive drives the magnetic tape in a reverse direction.

According to one aspect of the invention, a disk-drive-compatible magnetic tape cartridge comprises a cartridge casing acceptable in a disk drive and defining therein a tape run path across a disk drive for establishing communication between a magnetic tape and the disk drive for recording and reproducing a tape track formed on the magnetic tape, a tape drive mechanism for driving the magnetic tape along the tape run path, the tape driving mechanism being designed to selectively drive the magnetic tape both in forward and reverse directions, and a center core assembly disposed within the cartridge casing and exposed therefrom to be chucked by a disk driving mechanism of the disk drive, the center core assembly including a first chucking means active in forward direction drive of the magnetic tape for establishing chucking engagement between the center core assembly and the disk driving mechanism for transmitting driving force of the driving mechanism to the tape drive mechanism, and a second chucking means active in reverse direction drive of the magnetic tape for establishing chucking engagement between the center core assembly and the disk driving mechanism for transmitting driving force of the disc-driving mechanism to the tape drive mechanism.

The first chucking means comprises a through opening defined in the center core assembly and having at least one corner, to receive a driving pin provided in the driving mechanism of the disk drive for fixingly receiving the driving pin at the corner for establishing the chucking engagement. On the other hand, the second chucking means comprises a chucking pin extending from the center core assembly and engageable with a chucking opening defined in the driving mechanism of said disk drive and having at least one corner, the chucking pin being fixedly engageable with the corner of the chucking opening for establishing chucking engagement. The chucking pin of the first chucking means is normally biased in a direction away from the corner. The chucking pin of the second chucking means is supported by means of a resilient member which normally biases the chucking pin toward the chucking opening.

In a practical embodiment, the center core assembly comprises a center core disk formed with a groove extending around the periphery thereof for engaging with a drive belt which transmits driving force transmitted to the center core disk to the tape drive mechanism. The cartridge casing houses a pair of tape reels wound therearound by the magnetic tape. The tape reels have rotation axes aligned with each other. The tape drive mechanism is cooperative with the tape reels for driving one of the latter according to the tape driving direction by transmitting driving force transmitted through the center core disk to the one of tape reels.

The driving mechanism in the disk drive is designed to drivingly rotate the center core disk of the magnetic tape cartridge in a first direction for driving the magnetic tape in a the forward direction and in second direction opposite to the first direction for driving the magnetic tape in the reverse direction.

According to another aspect of the invention, a chucking and driving mechanism for a disk drive for driving a disk-drive-compatible tape comprising means for defining a tape run path passing across a disk drive head for transferring data between the magnetic tape and the disk drive head, and means for selectively driving a magnetic tape in forward and reverse directions along the tape run path, in which the chucking and driving mechanism comprises a driving mechanism provided in the disk drive for rotatingly driving a magnetic disk, the driving mechanism including a rotary disk driven by a drive shaft of the disk drive, a center core assembly rotatably provided in the magnetic tape cartridge and cooperating with the magnetic tape driving means for selectively driving the magnetic tape in forward and reverse directions selectively, a first chucking means, active while the magnetic tape is driven in the forward direction for chucking the center core assembly of the magnetic tape cartridge onto the rotary disk of the disk drive so as to transmit driving torque of the drive shaft to the magnetic tape driving means therethrough, and a second chucking means, active while the magnetic tape is driven in the reverse direction for chucking the center core assembly onto the rotary disk so as to transmit driving torque of the drive shaft to the magnetic tape driving means therethrough.

The center core assembly comprises a center core disk to be chucked on the rotary disk of the disk drive for rotation therewith and hereby transmitting driving torque of the drive shaft therethrough. Each of the first and second chucking means comprises a chucking pin coupled with one of the center core disks and the rotary disk and a chucking aperture formed in the other of the center core disks and the rotary disk and having at least one corner in to which the chucking pin is forcibly depressed for establishing chucking engagement between the center core disk and the rotary disk. The chucking pin is resiliently supported by means of a resilient member for assuring chucking engagement with the chucking aperture.

The magnetic tape cartridge further comprises first and second reels provided at respective ends of the tape run path and wound therearound by the magnetic tape for feeding the magnetic tape from one to the other. The first and second tape reels have rotation axes aligned with each other.

The magnetic tape driving means comprises a first gear provided for rotation of the first reel, a second gear provided for rotation of the second reel and a third gear coupled with the center core disk to be driven by driving torque transmitted through the center core disk as chucked on the rotary disk, the third gear being moveable between a first position where it engages with the first gear for transmitting driving torque to the first gear in forward drive of the magnetic tape, and a second position where it engages with the second gear for transmitting driving torque to the second gear in the reverse drive of the magnetic tape.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
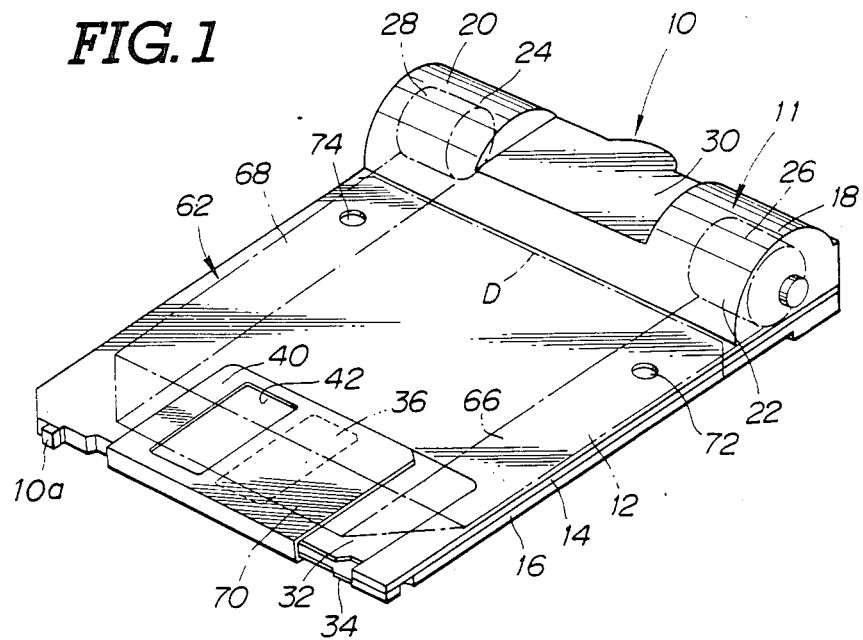
FIG. 1 is a perspective view of the preferred embodiment of a magnetic tape cartridge according to the invention.
Figure 2:
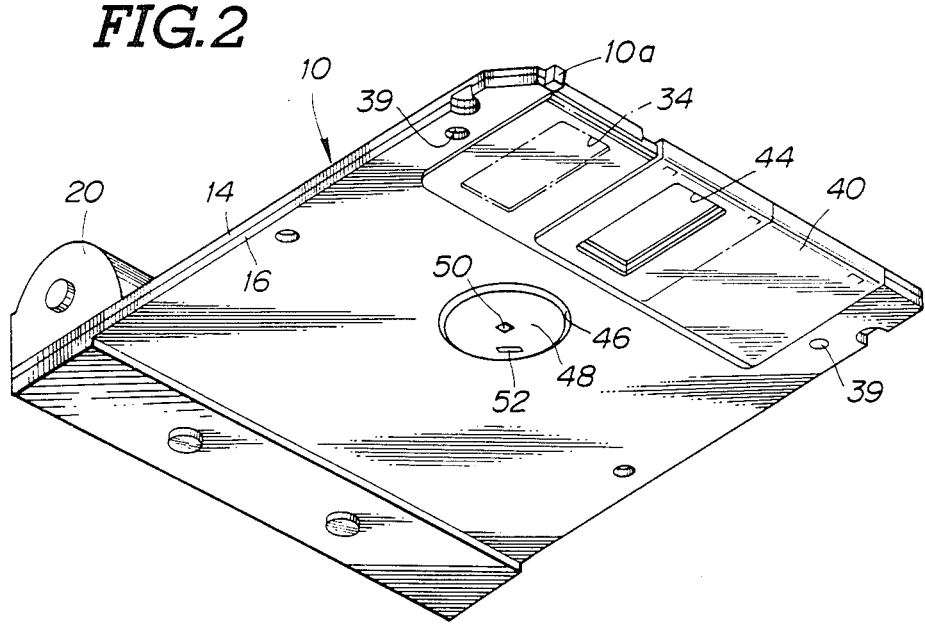
FIG. 2 is a perspective view of the preferred embodiment of the magnetic tape cartridge of FIG. 1, as viewed from the bottom.
Figure 3:
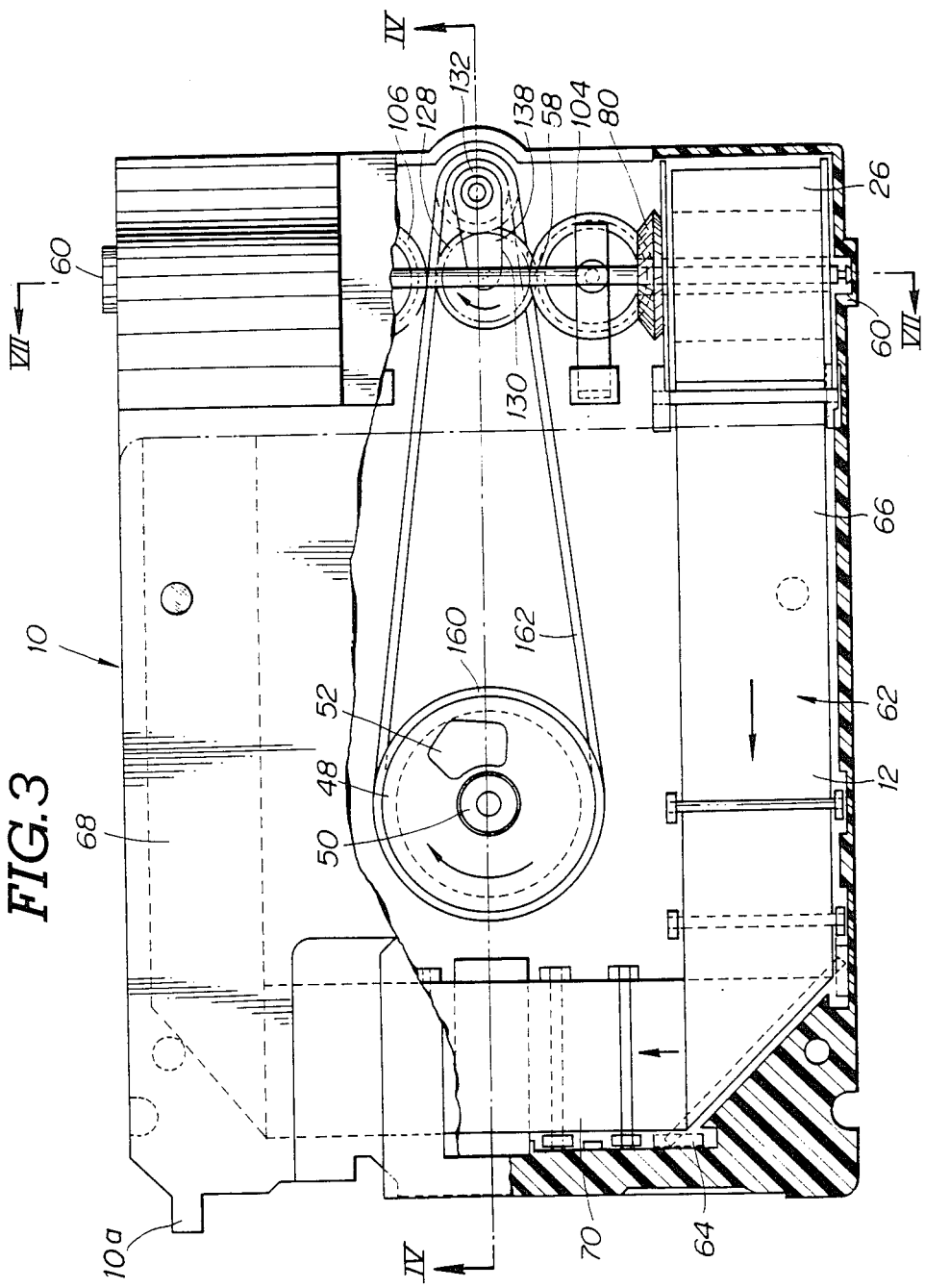
FIG. 3 is a plan view of the preferred embodiment of the magnetic tape cartridge of FIG. 1 in, which a portion of an upper half of the cartridge is removed to show the first embodiment of a tape drive mechanism.

Referring now to the drawings, FIGS. 1 to 3 show the preferred embodiment of a magnetic tape cartridge 10 which is compatible with a disk drive for floppy disks of corresponding size, such as 3.5-inch microfloppy disks of the type disclosed in the U.S. Pat. No. 4,445,155.

It should be appreciated that the following discussion of the preferred embodiment of the magnetic tape cartridge according to the invention is directed to a specific type of magnetic tape cartridge, specifically, one designed for use with a 3.5-inch microfloppy disk drive. However, it should be also appreciated that the present invention is applicable to magnetic tape cartridges compatible with disk drives of any size. Furthermore, although the magnetic tape cartridge disclosed herebelow employs a magnetic tape having two ends respectively wound around supply and take-up reels, the magnetic tape cartridge of the invention may also employ an endless-loop-type tape.

The preferred embodiment of the magnetic tape cartridge comprises a cartridge 10 and a magnetic tape 12 housed within the interior of the cartridge. The cartridge 10 is made up of an upper half 14 and a lower half 16. The upper and lower halves 14 and 16 are of equal size in plan view and are fixed to each other to form the cartridge 10. The cartridge 10 is of essentially the same size and shape as the microfloppy disk cartridge disclosed in U.S. Pat. No. 4,445,155 as set forth above, but is longer than the disk cartridge. The length of the normal disk cartridge relative to the length of the magnetic tape cartridge is illustrated by the phantom-line figure D in FIGS. 1 and 3.

However, it would be possible to make the magnetic tape cartridge 10 match the floppy disk cartridge not only in the width and thickness but also in length, if necessary. As will be appreciated herefrom, the preferred embodiment of the magnetic tape cartridge 10 has an extra section 11 which accommodates the tape reels, the tape drive mechanism and so forth. When this magnetic tape cartridge is loaded into a disk drive for which it is designed, the extra section 11 will remain outside of the disk drive, protruding from the opening of the disk drive.

As shown in FIGS. 1 and 2, the cartridge 10 is further formed with a projection 10a projecting from the front end of the cartridge. This projection 10a serves as an indicator for making the disk drive recognize that the magnetic tape cartridge is in use.

The upper half 14 has semi-cylindrical hollow extensions 18 and 20 near its rear corners and along its rear edge ("rear" referring to the direction of insertion into the disk drive). The semi-cylindrical hollow extensions 18 and 20 extend upwards from the upper surface of the upper half 14 and thus define tape reel receptacles 22 and 24 receiving a supply reel 26 and a take-up reel 28. A space 30 for a power train, ( which will be described in detail later, remains between the tape reel receptacles 22 and 24.

The upper and lower halves 14 and 16 have recesses 32 and 34 exposed to the outside on their upper and lower surfaces respectively. Longitudinally (with respect to the direction of insertion) elongated tape access apertures 36 and 38 are formed in the upper and lower halves 14 and 16 within the recesses 32 and 34. The tape access apertures 36 and 38 are aligned with each other to allow a disk drive head (not shown) of a disk drive access to the tape. The disk drive can be the same as or slightly modified from that disclosed in the foregoing U.S. Pat. No. 4,445,155. Therefore, the disclosure concerning the disk drive in the U.S. Pat. No. 4,445,155 is hereby incorporated by reference for the sake of disclosure.

The upper and lower halves 14 and 16 also have positioning holes 39 for positioning the tape cartridge 10 within the disk drive. The positioning holes 39 of the upper and lower halves 14 and 16 are aligned with each other and are designed to receive a positioning pin (not shown) built into the disk drive.

A sliding shutter 40 slidingly engages the recesses 32 and 34. Upper and lower surfaces of the sliding shutter 40 lie essentially flush with the upper and lower surfaces of the cartridge 10 as assembled. The sliding shutter 40 has longitudinally elongated apertures 42 and 44 of the same size and configuration as the tape access apertures 36 and 38 of the cartridge 10. The sliding shutter 40 is movable between a closed position, in which the apertures 42 and 44 offset from the tape access apertures 36 and 38 thus hiding the tape 12 and an open position, in which the apertures 42 and 44 are aligned with the tape access apertures 36 and 38 to allow the disk drive head access to the tape. The sliding shutter 40 is normally biased by a spring (not shown) toward the closed position and is actuated to the open position when the magnet tape cartridge is inserted into the disk drive.

Figure 4:
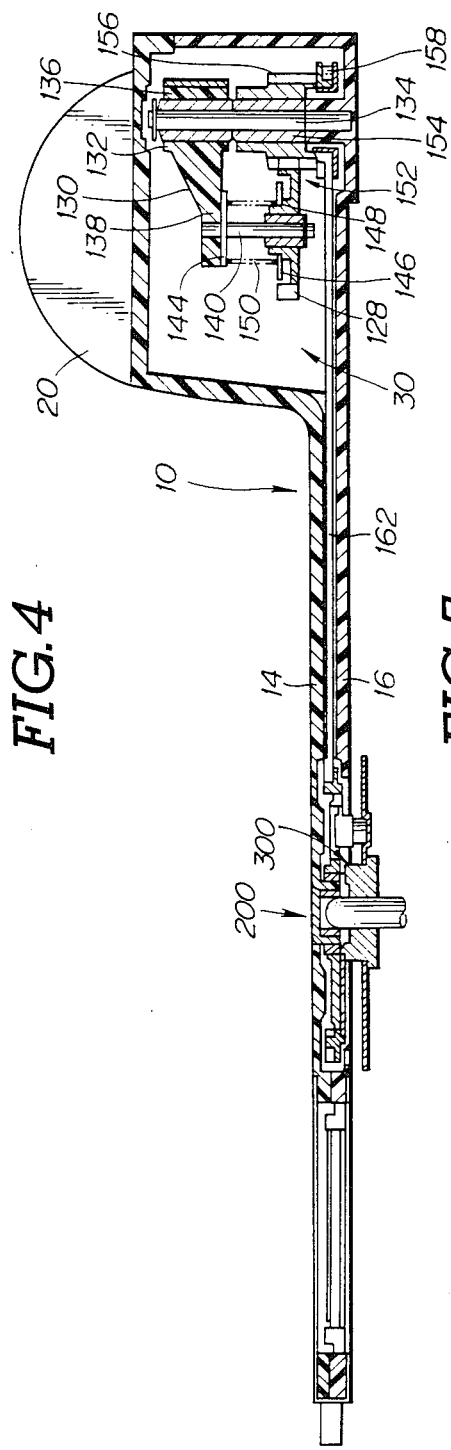
FIG. 4 is a longitudinal section of the preferred embodiment of the magnetic tape cartridge with the first embodiment of the tape drive mechanism, in which the section is taken along line IV—IV of FIG. 3.
Figure 5:
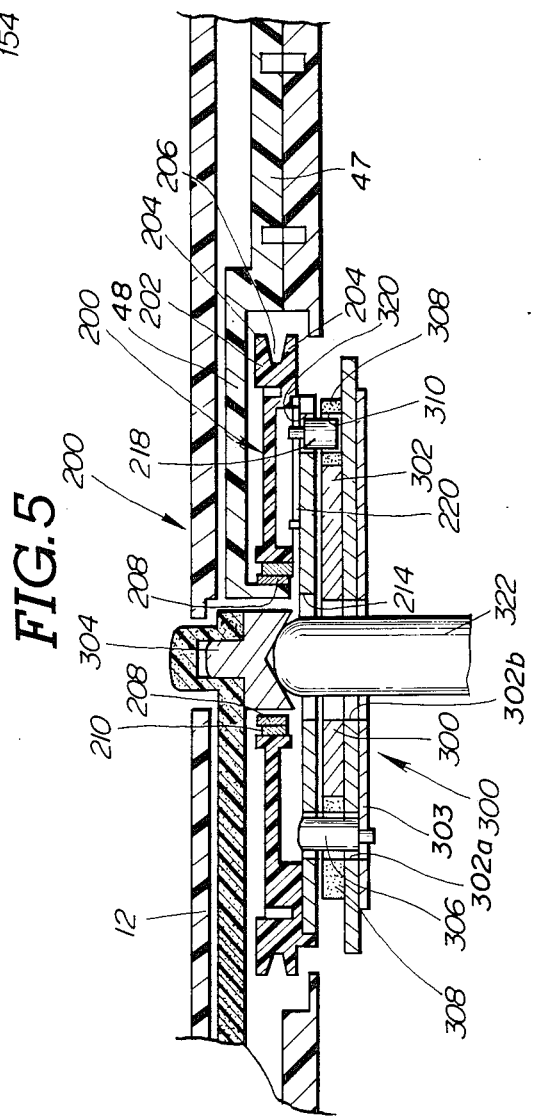
FIG. 5 is an enlarged section of a center core disk in the preferred embodiment of a magnetic tape cartridge of FIG. 4.
Figure 6:
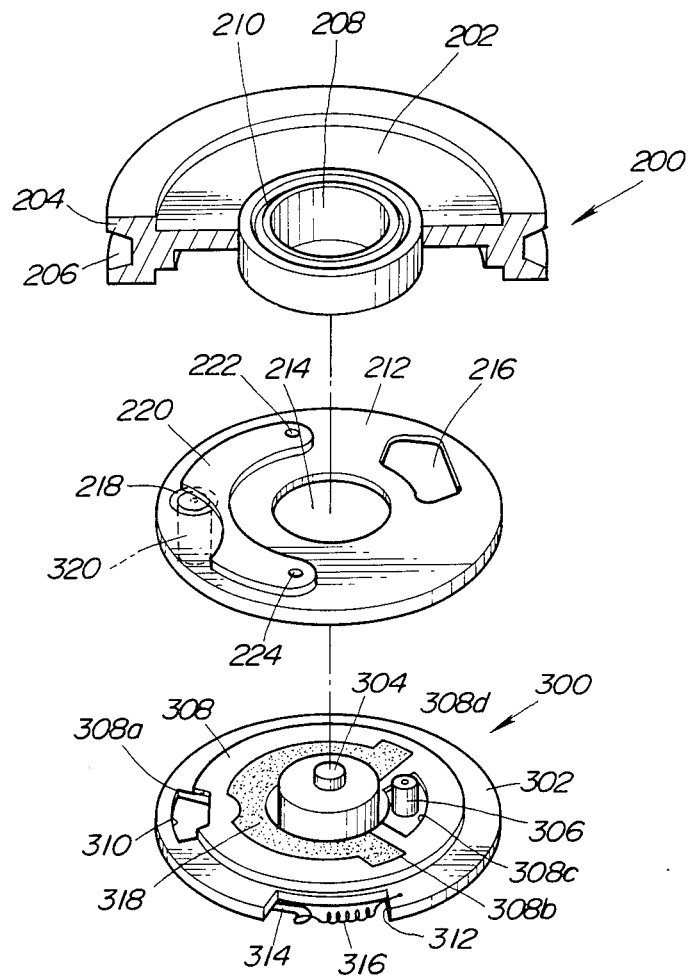
FIG. 6 is an exploded perspective view of a chucking mechanism for the preferred embodiment of the magnetic tape cartridge, the depicted chucking mechanism comprises the center core disk of FIG. 5 and a chucking table in a disk drive.

In order to drive couple the magnetic tape cartridge to a disk drive, a chucking mechansim is provided. Referring now to FIGS. 4, 5 and 6, the chucking mechanism generally comprises a center core assembly 200 in the magnetic tape cartridge and a turn table assembly 300 in the disk drive. The center core assembly 200 is exposed through a central aperture 46 formed in the lower half 16 of the cartridge 10. The center core assembly 200 comprises a center core disk 202. The center core disk 202 is rotatably mounted on a support plate 47 which is fixed to the upper surface of the lower half of the cartridge 16. The support plate 47 has an essentially C-shaped end section 48 which defines a recess 49 for receiving a part of the center core disk through a bearing 49, such as an oilless metal bearing, as shown in FIGS. 4, 5 and 6. The center core disk 202 opposes the center aperture 46 in the lower half 16 and is thus exposed through the center aperture 46 of the lower half. The center core disk 202 is formed into essentially H-shaped configration in cross-section and thus comprises an annular-disc formed main section 203 and cylindrical inner flange section 204, as clearly shown in FIG. 6. An essentially V-shaped groove 206 is formed on the outer periphery of the flange section 204. The center core disk 202 also has a cylindrical inner flange section 210. The outer flange section 210 has an internal diameter approximately corresponding to the external diameter of the bearing 49. Therefore, the inner flange section 210 slidingly and loosely contacts the outer periphery of the bearing 49 for allowing rotation of the center core disk 202 about the bearing.

The center core disk 202 also defines a recess 202a at the underside thereof. A driven plate 212 is received within the recess 202a and fixed to the center core disk 202 for rotation therewith. The driven plate 212 is formed with a center positioning aperture 214 and a driving and positioning aperture 216. The driving and positioning aperture 216 is offset by a given distance from the center positioning aperture 214. The center positioning aperture 214 is designed to engage a disk drive motor spindle 322 through a metal fitting 304 which is fixedly mounted on a tape guide member 340. On the other hand, the driving and positioning aperture 216 is designed to engage a driving pin 306 mounted on a turntable 302 of the disk drive through a resilient spring 303. The driving pin 306 is fixed to the resilient leaf spring 303 and normally biased upwardly. Therefore, the driving pin 306 extends upwardly through an aperture 302a formed through the turntable 302 to pass through the driving and positioning aperture 216 of the center core disk 202. On the other hand, the turntable 302 is driven to rotate by the motor spindle 322. Therefore, the center core disk 202 is driven to rotate by the driving force transmitted through the turntable 302 of the disk drive with engagement of the driving and positioning aperture 216 and the driving pin 306 in per se well known manner. In order to establish chucking engagement between the driving pin 306 and the driving and positioning aperture 216, the leaf spring 303 is rotatingly biased by means of a bias coil spring 316. The coil spring 316 is disposed in a recess 312 formed on the outer periphery of the turntable 302 and engages with an engaging aperture formed in the vicnity of one edge of the recess 312 at one end. The other end of the coil spring 316 engages with a hook 314 formed on the leaf spring 303. By the resilient force of the coil spring 316, the leaf spring 303 is normally biased in counterclockwise direction as viewed in FIG. 6.

The driven plate 212 is also formed with a circular aperture 218 to receive therethrough an auxiliary drive pin 310. The auxiliary drive pin 310 is resiliently supported by means of an essentially arc-shaped leaf spring 220 which has both ends 222 and 224 fixed to the upper surface of the driven plate 212. The leaf spring 220 resiliently biases the auxiliary drive pin 310 downwardly to protrude from the lower surface of the driven plate 212. The auxiliary drive pin 310 drivingly engages with a driving aperature 319 of the turntable 302 through a recess 308a formed on the outer periphery of drive ring 308 fitted to the turntable. The drive ring 308 is also formed with an essentially rectangular aperture 308c to receive therethrough the driving pin 306. The auxiliary drive pin 310 is so arranged as to establish chucking engagement with the driving aperture 319 in reverse driving of the magnetic tape.

The driving ring 308 generally surrounds a magnetic plate 318. The magnetic plate 318 is of generally U-shaped configuration and arranged around the center opening 302b of the turntable. The magnetic plate 318 has extensions 318a and 318b respectively engaging with recesses 308b and 308d formed in the inner periphery of the driving ring 308. The magnetic plate 318 is so designed as to draw and magnetically engage the driven plate 212 for assisting driving engagement between the turntable 302 and the center core disk 202.

As will be appreciated herefrom, when the magnetic tape 12 is to be driven in forward direction, the driving pin 306 of the turntable 302 establishes clutching engagement with the driving and positioning aperture 216 of the driven plate 212 to rotatingly drive the center core disk, by contacting the periphery thereof against the peripheral edges in the vicnity of the corner of the driving and positioning aperture. On the other hand, when the turntable 302 is driven in reverse direction to drive the magnetic tape 12 in the reverse direction, the auxiliary drive pin 310 contacts with the peripheral edges of the driving aperture 319 to establish chucking engagement. Therefore, in the shown chucking mechanism, the magnetic tape can be steadily driven both in forward and reverse directions.

Figure 7:
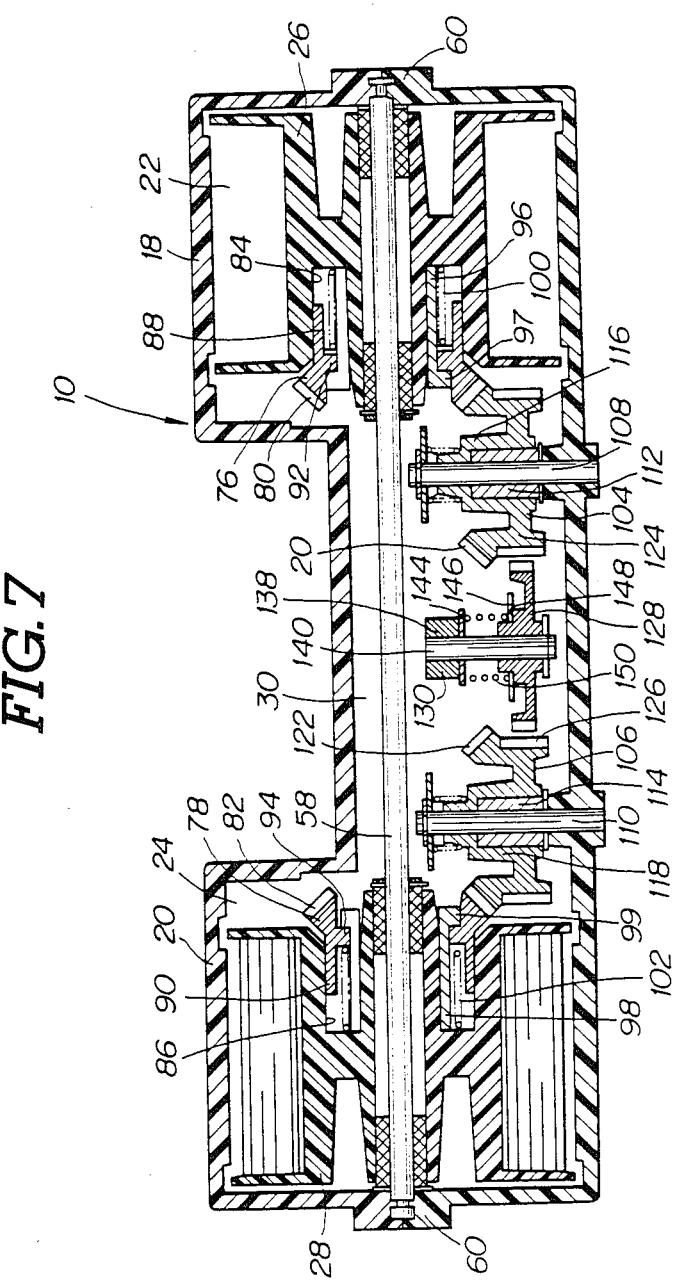
FIG. 7 is a cross-section of the preferred embodiment of the magnetic tape cartridge taken along line VII—VII in FIG. 3.
Figure 8:
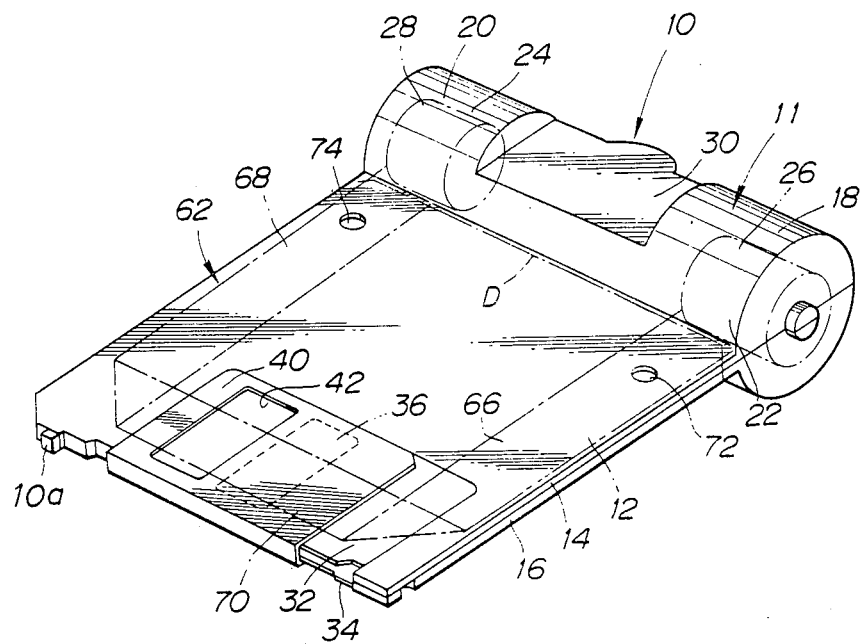
FIG. 8 a perspective illustration of an alternative embodiment of the magnetic tape cartridge according to the invention.

The supply and take-up reels 26 and 28 are rotatably supported by a support shaft 58, the ends of which are fixed to boss sections 60 formed on the side walls of the semi-cylindrical extensions 18 and 20 as shown in FIG. 7. Therefore, the supply and take-up reels 26 and 28 are mounted within the tape reel receptacles 22 and 24 with their axes lying transverse. The supply and take-up reels 26 and 28 are rotatably supported by a support shaft 58, the ends of which are fixed to boss sections 60 formed on the side walls of the semi-cylindrical extensions 18 and 20 as shown in FIG. 7. Therefore, the supply and take-up reels 26 and 28 are mounted within the tape reel receptacles 22 and 24 with their axes lying transverse. A tape run path 62 is defined within the thin space defined in the front portion of the cartridge along which the magnetic tape passes between the tape access apertures 36 and 38. Tape guides 64 define the tape run path 62. As will be seen from FIGS. 1 and 3, the tape run path 62 has a first section 66 near the supply reel 26 and extending longitudinally along one edge of the cartridge, a second section 68 near the take-up reel 28 and extending longitudinally along the other edge of the cartridge, and a third section 70 extending laterally across the front edge and between the tape access apertures 36 and 38. At the junctures of the first section 66 and third section 70, and of the second section 68 and third section 70, the tape guides 64 are provided to deflect the tape.

In this disclosure, the word "longitudinal" used in connection with the tape path means the axis of movement along the first and second sections 66 and 68 of the tape run path 62 set forth above, and the word "lateral" used in connection with the tape path means the axis of movement along the third section 70 of the tape run path 62 set forth above.

The upper and lower halves 14 and 16 have circular openings 72 and 74 opposing the first and second sections 66 and 68 of the tape run path 62. Through the openings 72 and 74, tape run path 62 can be monitored to detect the presence or absence of the tape. This tape monitoring mechanism per se is well known technique in tape recording and/or reproducing apparatus.

In order to selectively drive the supply reel 26 and the take-up reel 28 for recording and/or reproduction in forward and reverse directions, the preferred embodiment of the magnetic tape cartridge according to the present invention, is provided with a specially designed tape drive mechanism. In general, the take-up reel 28 is driven to extract the magnetic tape 12 from the supply reel through the tape run path 62 during recording and reproduction. This tape direction will be hereafter referred to as "forward". On the other hand, the supply reel 26 must be driven to extract the magnetic tape 12 from the take-up reel 28 during rewinding. The supply reel 26 drives the magnetic tape 12 through the tape run path 62 in the direction opposite to the forward direction. This direction will hereafter be referred to as "reverse".

The tape drive mechanism includes a pair of bevel gear blocks 76 and 78 as shown in FIGS. 4 and 7. The bevel gear blocks 76 and 78 are generally cylindrical and have bevel gears 80 and 82 respectively at one end thereof. The bevel gear blocks 76 and 78 are co-axially mounted on the facing axial ends of the supply reel 26 and the take-up reel 28. In practice, as best shown in FIG. 7, the supply reel 26 and the take-up reel 28 are formed with annular grooves 84 and 86. The cylindrical sections 88 and 90 of the bevel gear blocks 76 and 78 are inserted into the annular grooves 84 and 86 of the supply reel 26 and the take-up reel 28. Annular projections 92 and 94 are formed on the inner periphery of the cylindrical sections 88 and 90 of the bevel gear blocks 76 and 78. Cylindrical retainers 96 and 98 with flanges 97 and 99 are fitted into the annular grooves 84 and 86 so as to retain the cylindrical sections 88 and 90 of the bevel gear blocks 76 and 78 within the annular grooves 84 and 86. Compression coil springs 100 and 102 are also disposed within the annular grooves 84 and 86. One end of the springs 100 and 102 seating on the bottom of the annular grooves and the opposite ends thereof seating on the annular projections 92 and 94 of the cylindrical sections 88 and 90 in order to bias the bevel gear blocks 76 and 78 against the flanges 97 and 99 of the retainers 96 and 98.

The bevel gear blocks 76 and 78 are rotatable with the supply reel 26 and the take-up reel 28. If necessary, the bevel gear blocks 76 and 78 can be keyed to the inner periphery of the annular grooves 84 and 86 with suitable keying means so as to ensure rotation with the associated supply reel 26 and take-up reel 28.

A pair of intermediate gear blocks 104 and 106 are rotatably supported by gear shafts 108 and 110 extending vertically from the floor of the cartridge 10. Bearings 112 and 114 are disposed between the gear shafts 108 and 110 and cylindrical sections 116 and 118 of the intermediate gear blocks 104 and 106. The gear shafts 108 and 110 are arranged in lateral alignment at a given distance from each other. The distance between the gear shafts 108 and 110 is slightly greater than or approximately equal to twice the outer diameter of the intermediate gear blocks 104 and 106. The intermediate gear blocks 104 and 106 have bevel gears 120 and 122 respectively at their upper ends. Respective bevel gears 120 and 122 constantly engage the corresponding bevel gears 80 and 82.

The intermediate gear blocks 104 and 106 also have plane gears 124 and 126 below the bevel gears 120 and 122. The plane gears 124 and 126 lie in the same horizontal plane at a given distance from each other. As set forth above, since the gear shafts 108 and 110 are separated by a distance slightly greater than or approximately equal to the outer diameter of the intermediate gear blocks 104 and 106, the distance between the plane gears 124 and 126 is slightly greater than the outer diameter thereof.

A two-way coupling gear 128 is disposed between the plane gears 124 and 126. The two-way coupling gear 128 is mounted on a pivotal base 130. The pivotal base 130 has a cylindrical base section 132 pivotably mounted at the top of a pivot shaft 134 extending vertically from the floor of the cartridge 10. A sleeve bearing 136 is interposed between the inner periphery of the cylindrical base section 132 and the outer periphery of the pivot shaft 134 to allow pivotal movement of the pivotal base. The pivotal base 130 also has a pivoting arm 138. A gear shaft 140 extends downward from the pivotal arm 138. Adjacent to its lower end, the gear shaft 140 mounts the two-way coupling gear 128. The two-way coupling gear 128 is rotatable about the gear shaft 140. A sleeve bearing 142 is disposed between the contacting faces of the gear shaft 140 and the two-way coupling gear 120.

An annular slip plate 144 loosely engages the gear shaft 140 for the two-way coupling gear 128. Also, an annular-disc-shaped spring seat 146 engages the stepped outer periphery 148 of the two-way coupling gear 128. A compression coil spring 150 is disposed between the slip plate 144 and the spring seat 146 to exert a biasing spring force on the slip plate 144 for frictional engagement with the lower surface of the pivoting arm 138. At the same time, the spring force of the compression coil spring 150 is exerted on the two-way coupling gear 128 through the spring seat 146. The slip plate 144 and the coil spring 150 constitute a clutch mechanism which causes the pivotal base to pivot so as to bring the two-way coupling gear 128 into engagement with one of the plane gears 124 and 126 of the intermediate gear blocks 104 and 106, depending on the direction of rotation of the two-way gear 128.

A drive gear block 152 is mounted at the lower end of the pivot shaft 134 through a sleeve bearing 154. The drive gear block 152 has a drive gear 156 constantly engaging the two-way coupling gear 128. The drive gear block 152 also has a pulley 150 integrally formed with the drive gear 156. The pulley 158 is connected to a pulley 160 integral with the center core disk 48 by means of a driving belt 162.

It should be appreciated that the gear ratio of the aforementioned tape drive mechanism is selected so as to drive the magnetic tape at a speed equal to the rotation speed of a floppy disk on the same disk drive. Specifically, the tape speed at the third section 70 of the tape run path 62 has to be equal to the rotation speed of the floppy disk, so that the disk drive can use the same recording and reproduction operations without adjustment.

For this purpose, speaking of a conventional 3.5 inch floppy disk, it rotates at about 600 r.p.m. so as to be free of peak-shift errors and data droppage. Therefore, if it is assumed that the linear velocity of the outermost track is $V_1$ and that of the innermost track is $v_2$, it is favorable that the feed rate v of the magnetic tape according to the invention be $v_2 < V < v_1$.

In order to drive the magnetic tape forward (from the supply reel 26 onto the take-up reel 28), the turntable is driven clockwise in FIG. 3. According to clockwise rotation of the turntable, the center core disk 48 is driven clockwise. The clockwise rotational force is transmitted from the pulley 160 of the center core disk 48 to the pulley 158 of the drive gear block 152 through the drive belt 162. Therefore, the drive gear 156 is driven to rotate clockwise in FIG. 3.

As long as the two-way coupling gear 128 remains free of the plane gears 124 and 126 of the intermediate gear blocks 104 and 106, the slip plate 144 maintains frictional engagement with the mating surface of the pivoting arm 138 of the pivotal base 130 due to the spring force of the coil spring 150. Therefore, the rotational force transmitted by the drive gear 156 of the drive gear block 152 to the two-way coupling gear 128 serves to drive the pivotal base 130 to pivot clockwise.

Once the two-way coupling gear 128 comes into engagement with the plane gear 126 of the intermediate gear block 106, pivotal movement of the pivotal base 130 is restricted. Then the rotational driving force transmitted by the drive gear 156 to the two-way coupling gear 128 overcomes the spring force of the coil spring 150 and so causes slip between the mating surfaces of the slip plate 144 and the pivoting arm 138. As a result, the two-way coupling gear 128 starts to rotate counterclockwise, thereby driving the plane gear 126 of the intermediate gear clockwise. The bevel gear 122 of the intermediate gear block 106 thus rotates clockwise, which causes the bevel gear 76 to drive the take-up reel 28 to wind in the magnetic tape 12.

On the other hand, in order to switch from forward to reverse, the direction of rotation of the turntable is switched from clockwise to counterclockwise as viewed in FIG. 3. According to counterclockwise rotation of the turntable, the center core disk 48 is driven counterclockwise. The counterclockwise rotational force is transmitted from the pulley 160 of the center core disk 48 to the pulley 158 of the drive gear block 152 through the drive belt 162. Therefore, the drive gear 156 is driven counterclockwise in FIG. 3.

As long as the two-way coupling gear 128 remains free of the plane gear 124 of the intermediate gear block 104, the slip plate 144 maintains frictional engagement with the mating surface of the pivoting arm 138 of the pivotal base 130 due to the spring force of the coil spring 150 as the two-way coupling gear 128 becomes free from the clockwise rotational force of the drive gear 156. Therefore, the counterclockwise rotational force transmitted by the drive gear 156 of the drive gear block 152 to the two-way coupling gear 128 serves as a driving force for the pivotal base 130, causing the pivotal base to pivot counterclockwise in FIG. 3.

Once the two-way coupling gear 128 comes into engagement with the plane gear 124 of the intermediate gear block 104, pivotal movement of the pivotal base 130 is restricted. Then, the rotational driving force transmitted by the drive gear 156 to the two-way coupling gear 128 overcomes the spring force of the coil spring 150, causing slip between the mating surfaces of the slip plate 144 and the pivoting arm 138. As a result, the two-way coupling gear 128 starts to rotate clockwise, thus driving the plane gear 124 of the intermediate gear 104 counterclockwise. The bevel gear 120 of the intermediate gear block 104 is thus rotated clockwise, causing the bevel gear 74 to drive the supply reel 26 to rewind the magnetic tape.

In the preferred embodiment, magnetic tape 12 ¾-inch wide is employed in the magnetic tape cartridge. In this case, 80 recording tracks can be formed, which corresponds to the number that can be formed on a 3.5-inch floppy disk. Each track formed on the tape extends longitudinally along the tape. It will be appreciated that the length of each track depends solely on the length of the tape and therefore can be substantially longer than the length of the recording tracks formed on 3.5-inch floppy disks. In general, the capacity of each track on the magentic tape will be several tens of times greater than that of a track on a floppy disk. If the tape is 12 m long, the capacity of the magnetic tape cartridge will be approximately 20 megabyte.

It will be appreciated that the magnetic tape employed in the preferred embodiment of the magnetic tape cartridge can be tracked by means of conventional tracking mechanisms employed in conventional disk drives.

As will be appreciated herefrom, the preferred embodiment of the magnetic tape cartridge according to the present invention can provide a very large data storage capacity. Therefore, this magnetic tape cartridge is suitable for use as backup storage for hard-disks or floppy disks. Furthermore, this magnetic tape cartridge can be utilized in a filing system which requires high-capacity memory media.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. Appartus for driving a magnetic tape past a magnetic head in a floppy-disk disk-drve assembly for transferring data between said magnetic tape and said magnetic head, in which the disk drive assembly includes a drive element for driving the magnetic tape in forward and reverse directons, said apparatus comprising:
   a magnetic tape cartridge having said magnetic tape movably arranged therein;
   means arranged in said magnetic tape cartridge for driving said magnetic tape;
   a driving mechanism included in said disk drive assembly for rotatingly driving a magnetic disk, said driving mechanism including a rotary disk-shaped turntable driven by a drive shaft of said drive element, said turntable including a floppy-disk chucking pin and having an opening with first and second edges formed therein;
   a center core assembly rotatably provided in said magnetic tape cartridge and cooperating with said magnetic tape driving means for selectively driving said magnetic tape in forward and reverse directions, said center core assembly having a tape chucking pin, said tape chucking pin cooperating with said first edge of said opening of said turntable for establishing a first chucking means, active while said magnetic tape is driven in said forward direction for chucking said center core assembly of said magnetic tape cartridge onto said rotary disk of said disk drive so as to transmit driving torque of said drive shaft to said magnetic tape driving means and said tape chucking pin cooperating with said second edge of said opening of said turntable for establishing a second chucking means, active while said magnetic tape is driven in said reverse direction for chucking said center core assembly onto said rotary disk so as to transmit driving torque of said drive shaft to said magnetic tape driving mean.

2. A combination as set forth in claim 1, wherein said center core assembly comprises a center core disk to be chucked on said rotary disk of said disk drive for rotation therewith and thereby transmitting driving torque of said drive shaft therethrough.

3. A combination as set forth in claim 2, wherein each of said first and second chucking means comprises a chucking pin coupled with one of said center core disk and said rotary disk and a chucking aperture formed in the other of said center core disk and said rotary disk and having at least one corner to which said chucking pin is forcibly depressed for establishing chucking engagement between said center core disk and said rotary disk.

4. A combinaton as set forth in claim 3, wherein said chucking pin is resiliently supported by means of a resilient member for assuring chucking engagement with said chucking aperture.

5. A combination as set forth in claim 4, wherein said magnetic tape cartridge further comprises a first and second reels provided at respective ends of said tape run path and wound therearound by said magnetic tape for feeding said magnetic tape from one to the other.

6. A combination as set forth in claim 5, wherein said first and second tape reels have rotation axes aligned to each other.

7. A combination as set forth in claim 5, wherein said magnetic tape driving means comprises a first gear provided for rotation with said first reel, a second gear provided for rotation with said second reel and a third gear coupled with said center core disk to be driven by driving torque transmitted through said center core disk as chucked on said rotary disk, said third gear being moveable between a first position where it engages with said first gear for transmitting driving torque to said first gear in forward drive of said magnetic tape, and a second position where it engages with said second gear for transmitting driving torque to said second gear in said reverse drive of said magnetic tape.

8. A magnetic tape cartridge for use with a floppy-disk disk driving mechanism comprising:
a cartridge casing including therein a tape run path for a magnetic tape arranged in said cartridge casing for recording and reproducing a tape track formed on said magnetic tape;
a tape drive mechanism arranged within said cartridge casing for driving said magnetic tape along said tape run path, said tape driving mechanism selectively driving said magnetic tape both in forward and reverse directions;
a center core assembly rotatably mounted in said cartridge casing to be chucked by the floppy-disk disk driving mechanism, said center core assembly including a first chucking means active in a forward direction drive of said magnetic tape for establishing chucking engagement between said center core assembly and said disk driving mechanism for transmitting driving force of said disk driving mechanism to said tape drive mechanism, and a second chucking means active in a reverse direction drive of said magnetic tape for establishing chucking engagement between said center core assembly and said disk driving mechanism for transmitting driving force of said disk driving mechanism to said tape drive mechanism.

9. A magnetic tape cartridge as set forth in claim 8, wherein said disk drive includes a driving pin and said first chucking means comprises a through opening formed in said center core assembly and having at least one corner for receiving said driving pin at said corner for establishing said chucking engagement.

10. A magnetic tape cartridge as set forth in claim 9, wherein said chucking pin is normally biased in a direction away from said corner.

11. A magnetic tape cartridge as set forth in claim 8, wherein said second chucking means comprises a chucking pin extending from said center core assembly and engageable with a chucking opening defined in said driving mechanism of said disk drive and having at least one corner, said chucking pin being fixedly engageable with said corner of said chucking opening for establishing chucking engagement.

12. A magnetic tape cartridge as set forth in claim 11, wherein said chucking pin is supported by means of a resilient member which normally biases said chucking pin toward said chucking opening.

13. A magnetic tape cartridge as set forth in claim 8, further comprising a drive belt and wherein said center core assembly comprises a center core disk formed with a groove extending around the periphery thereof for engaging said drive belt which transmits driving force transmitted to said center core disk to said tape drive mechanism.

14. A magnetic tape cartridge as set forth in claim 13, wherein said cartridge casing houses a pair of tape reels wound therearound by said magnetic tape.

15. A magnetic tape cartridge as set forth in claim 14, wherein said tape reels have rotation axes aligned to each other.

16. A magnetic tape cartridge as set forth in claim 15, wherein said tape drive mechanism cooperates with said tape reels for driving one of said tape reels according to a tape driving direction by transmitting driving force transmitted through said center core disk to said one of tape reels.

17. A magnetic tape cartridge as set forth in claim 16, wherein said disk driving mechanism in said disk drive includes means for rotating with said center core disk of said magnetic tape cartridge in a first direction for driving said magnetic tape in said forward direction and a second direction opposite to said first direction for driving said magnetic tape in said reverse direction.

18. A magnetic tape cartridge as set forth in claim 17, wherein said disk drive includes a driving pin and said first chucking means comprises a through opening defined in said center core assembly and having at least one corner for receiving said driving pin at said corner for establishing said chucking engagement.

19. A magnetic tape cartridge as set forth in claim 18, wherein said second chucking means comprises a chucking pin extending from said center core assembly and engageable with a chucking opening defined in said driving mechanism of said disk drive and having at least one corner, said chucking pin being fixedly engageable with said corner of said chucking opening for establishing chucking engagement.

20. A magnetic tape cartridge as set forth in claim 18, wherein said second chucking means comprises a chucking pin extending from said center core assembly and engageable with a chucking opening defined in said driving mechanism of said disk drive and having at least one corner, said chucking pin being fixedly engageable with said corner of said chucking opening for establishing chucking engagement.

21. A magnetic tape cartridge as set forth in claim 20, wherein said chucking pin is supported by means of a resilient member which normally biases said chucking pin toward said chucking opening.

* * * * *

UNITED STATES PATENT AND TRADEMARK OFFICE
CERTIFICATE OF CORRECTION

PATENT NO. : 4,779,156
DATED : October 18, 1988
INVENTOR(S) : Toshiro Ohta

It is certified that error appears in the above-identified patent and that said Letters Patent is hereby corrected as shown below:

Column 5, line 48, after "," delete "(".
Column 7, line 30, before "drive" first occurence, insert --a--.
Column 11, line 28, after "tape" insert --12--;
        line 29, delete "12".

IN THE CLAIMS.
Column 11, line 67, change "Appartus" to --Apparatus--.
Column 14, line 24, after "and" insert --in--.
Column 14, claim No. 19 should be deleted.
Claim 19 is incorrect and should read as follows:
--A magnetic tape cartridge as set forth in claim 18, wherein said chucking pin is normally biased in a direction away from said corner.--

Signed and Sealed this

Eighteenth Day of April, 1989

Attest:

DONALD J. QUIGG

Attesting Officer

Commissioner of Patents and Trademarks